(12) United States Patent
Oliveira

(10) Patent No.: US 8,463,334 B2
(45) Date of Patent: Jun. 11, 2013

(54) APPARATUS AND SYSTEM FOR PROVIDING WIDEBAND VOICE QUALITY IN A WIRELESS TELEPHONE

(75) Inventor: Louis Dominic Oliveira, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1652 days.

(21) Appl. No.: 10/098,907

(22) Filed: Mar. 13, 2002

(65) Prior Publication Data

US 2004/0198240 A1    Oct. 7, 2004

(51) Int. Cl.
*H04M 1/00*    (2006.01)

(52) U.S. Cl.
USPC ............. 455/575.1; 455/550.1; 379/433.02; 379/433.03; 381/360; 381/361; 381/355; 381/359; 381/368

(58) Field of Classification Search
USPC ............. 379/433.02, 433.03; 381/360, 361, 381/355, 359, 368
See application file for complete search history.

(56) References Cited

U.S. PATENT DOCUMENTS

| | | | | |
|---|---|---|---|---|
| 4,533,795 A | * | 8/1985 | Baumhauer et al. | 381/174 |
| 4,558,184 A | * | 12/1985 | Busch-Vishniac et al. | 381/174 |
| 5,282,245 A | * | 1/1994 | Anderson | 379/433.03 |
| 5,511,130 A | * | 4/1996 | Bartlett et al. | 381/170 |
| 5,615,273 A | * | 3/1997 | Lucey et al. | 381/361 |
| 5,673,326 A | * | 9/1997 | Goldfarb | 381/99 |
| 5,740,262 A | * | 4/1998 | Yoshida et al. | 381/361 |
| 5,790,679 A | * | 8/1998 | Hawker et al. | 381/163 |
| 5,905,803 A | * | 5/1999 | Dou et al. | 381/359 |
| 6,002,949 A | * | 12/1999 | Hawker et al. | 455/569.1 |
| 6,064,894 A | * | 5/2000 | Zurek et al. | 455/569.1 |
| 6,108,415 A | * | 8/2000 | Andrea | 379/433.03 |
| 6,321,070 B1 | * | 11/2001 | Clark et al. | 455/575.1 |
| 6,389,145 B2 | * | 5/2002 | Baumhauer et al. | 381/345 |
| 6,690,800 B2 | * | 2/2004 | Resnick | 381/73.1 |
| 7,035,282 B1 | * | 4/2006 | Jagadeesan et al. | 370/465 |
| 7,151,802 B1 | * | 12/2006 | Bessette et al. | 375/259 |
| 7,260,523 B2 | * | 8/2007 | Paksoy et al. | 704/220 |
| 7,330,814 B2 | * | 2/2008 | McCree | 704/219 |

FOREIGN PATENT DOCUMENTS

EP    0942570    9/1999

OTHER PUBLICATIONS

International Preliminary Examination Report PCT/US2003/007949, International Search Authority US, Aug. 22, 2006.
International Search Report PCT/US2003/007949, International Search Authority European Patent Office Sep. 17, 2003.

* cited by examiner

*Primary Examiner* — Wen Huang
(74) *Attorney, Agent, or Firm* — Howard H. Seo; Espartaco Diaz Hidalgo

(57) ABSTRACT

A wideband voice electro-acoustic apparatus for a wireless telephone, including a mouthpiece for a wireless telephone. The mouthpiece has a wideband voice frequency response/passband in the frequency range of 200 Hz to 7000 Hz. The apparatus also includes an earpiece for a wireless telephone. The earpiece has a wideband voice passband in the frequency range of 200 Hz to 7000 Hz. The wideband voice electro-acoustic apparatus improves the voice quality of wireless voice band communication over that available using a conventional wireless telephone having an electro-acoustic passband smaller than 200 Hz to 7000 Hz.

21 Claims, 17 Drawing Sheets

(SIDE)

(FRONT VIEW, OPEN)

(FRONT VIEW, COLLAPSED)

(SIDE VIEW, COLLAPSED)

(TOP VIEW, COLLAPSED)

(BOTTOM VIEW, COLLAPSED)

APPARATUS AND SYSTEM FOR PROVIDING WIDEBAND VOICE QUALITY IN A WIRELESS TELEPHONE

BACKGROUND OF THE INVENTION

1. Field of the Invention

The present invention relates generally to wireless telephones, and more particularly, to an electro-acoustic apparatus in a wireless telephone.

2. Related Art

A wireless telephone capable of supporting voice band communication typically includes a mouthpiece for transducing a first acoustic signal from a user into a first electrical signal, and an earpiece for transducing a second electrical signal into a second acoustic signal. The mouthpiece and earpiece together form an electro-acoustic portion (also referred to as the "electro-acoustics") of the wireless telephone. During voice band communication, the wireless telephone user perceives a voice quality determined in part by a voice band frequency response of the electro-acoustic portion of the telephone. Typically, the wider the voice band frequency response, the better the perceived voice quality.

A conventional wireless telephone supports voice band communication limited to an audio frequency range of 300 Hertz (Hz) to 3400 Hz, in accordance with present Public Switched Telephone Network (PSTN) voice band limitations. Thus, the electro-acoustic portion of such a conventional wireless telephone typically has a voice band frequency response similarly limited to the frequency range of 300 Hz to 3400 Hz. That is, the conventional mouthpiece is likely to have an effective frequency response or "passband" limited to the range of 300 Hz to 3400 Hz, as is the conventional earpiece. The limited frequency response results in correspondingly limited or constrained voice quality.

It is generally desirable to improve the above-mentioned limited voice quality associated with a conventional wireless telephone. Thus, there is a need to improve/increase the audio frequency response of an electro-acoustic apparatus used in a wireless telephone compared to the conventional wireless telephone.

SUMMARY OF THE INVENTION

The present invention is directed to a wideband voice electro-acoustic apparatus for a wireless telephone. The present invention includes a mouthpiece for a wireless telephone having a wideband voice frequency response/passband in the frequency range of 200 Hz to 7000 Hz. The present invention also includes an earpiece for a wireless telephone having a wideband voice passband in the frequency range of 200 Hz to 7000 Hz. The wideband voice electro-acoustic apparatus improves the voice quality of wireless voice band communication over that available using a conventional wireless telephone having an electro-acoustic passband smaller than 200 Hz to 7000 Hz.

Thus, an embodiment of the present invention is a telephone earpiece for use in a wireless telephone. The earpiece includes an enclosure, and a speaker fixed within the enclosure for converting an electrical signal to an acoustic signal. The enclosure and the speaker are configured and arranged to cause the telephone earpiece to have a passband in a wideband voice frequency range of 200 Hz to 7000 Hz.

Another embodiment of the present invention is a telephone mouthpiece for use in a wireless telephone. The mouthpiece includes an enclosure, and a microphone fixed within the enclosure for converting an acoustic signal to an electrical signal. The enclosure and the microphone are configured and arranged to cause the telephone mouthpiece to have a wideband voice passband in a frequency range of 200 Hz to 7000 Hz.

Another embodiment of the present invention is a wideband voice electro-acoustic apparatus in a wireless telephone, including both a wideband voice mouthpiece and a wideband voice earpiece.

Further embodiments of the present invention will become apparent from the ensuing detailed description of the present invention.

BRIEF DESCRIPTION OF THE DRAWINGS/FIGURES

The present invention is described with reference to the accompanying drawings. The accompanying drawings, which are incorporated herein and form part of the specification, illustrate the present invention and together with the description further serve to explain the principles of the invention and to enable a person skilled in the relevant art(s) to make and use the invention. In the drawings, like reference numbers indicate identical or functionally similar elements. The terms "top," "bottom," "back," "front," "upper," and "lower" as used herein are relative. The terms "back" and "front" may be used interchangeably with "left" and "right," or alternatively, "right" and "left," depending on the figure being described.

DETAILED DESCRIPTION OF THE INVENTION

Environment

The present invention can be used with any type of telephone instrument, including wireless and non-wireless telephone instruments. It is particularly well suited for wireless telephony devices which support wideband audio communications. However the present invention may also be used with non-wireless telephony devices which support wideband audio communications. The embodiment of a wireless telephone described herein has a collapsible form factor. It should be understood that the invention can be readily adapted for a multitude of other wireless telephone form factors.

Figure 1A:
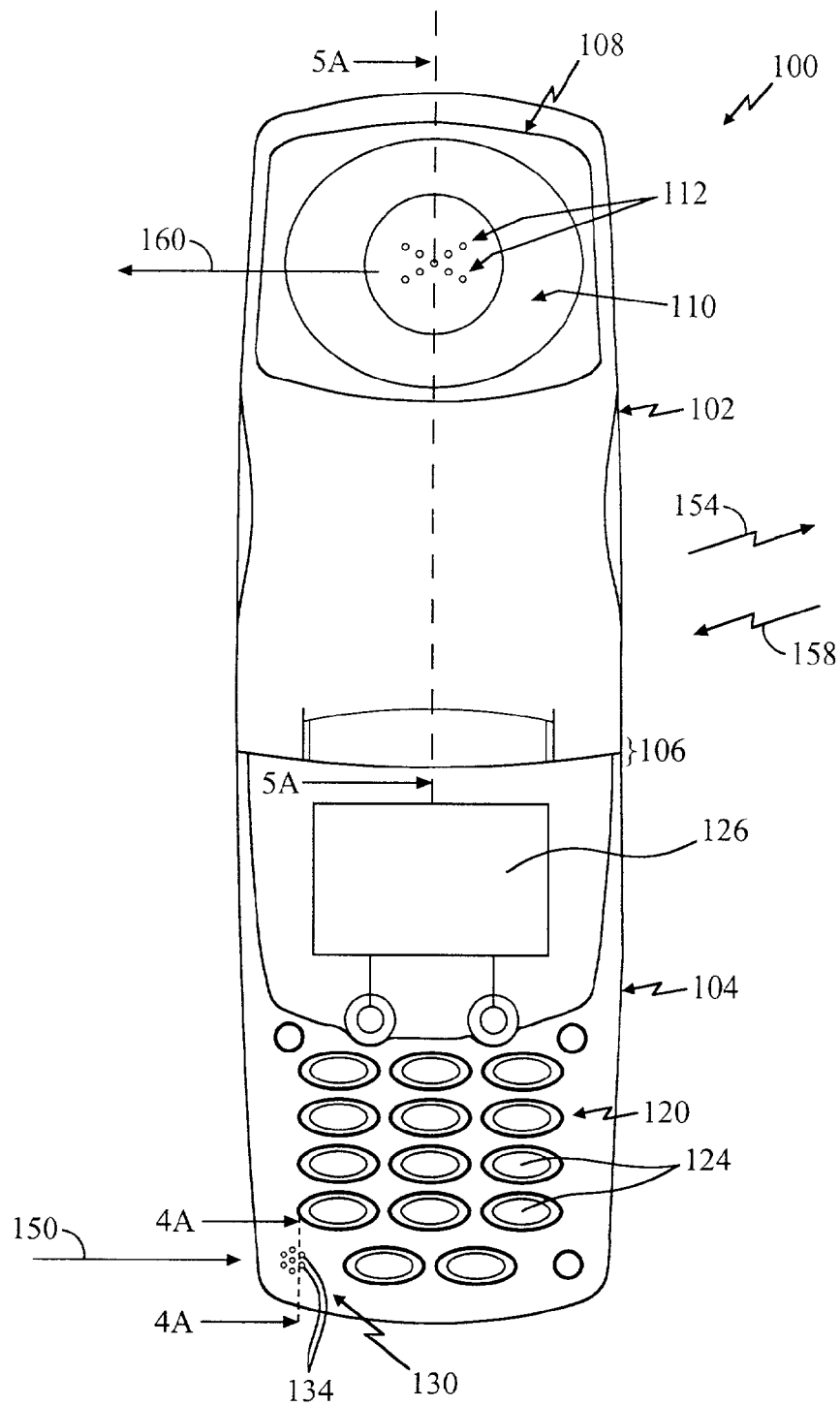
FIG. 1A is a front view of a folding- or collapsible-type, clamshell style wireless telephone having a wideband voice mouthpiece and a wideband voice earpiece of the present invention.

FIG. 1A is a front view of a folding- or collapsible-type wireless telephone 100 in which the present invention can be used. Wireless telephone 100 is depicted in an open position in FIG. 1A. Wireless telephone 100 is any wireless communication device (WCD), such as an analog and/or digital cellular telephone, a Personal Communications Services (PCS) telephone, a satellite based telephone, and so on, capable of supporting voice/audio band wireless communication. Wireless telephone 100 may operate in accordance with one or more current or future known wireless telephony standards, such as a Code Division Multiple Access (CDMA), Time Division Multiple Access (TDMA), analog and/or digital wireless telephony standard, or any combination thereof, for example. Wireless telephone 100 may be a fixed telephone terminal or portable unit.

Wireless telephone 100 includes a top portion 102 and a bottom portion 104 rotatively coupled to each other using a hinge mechanism (not depicted in FIG. 1A) retained in an intermediate portion 106 of the telephone. Upper portion 102 includes a protective upper-portion outer casing, referred to generally at 108, for housing a wideband voice earpiece, referred to generally at 110. Earpiece 110 includes a portion of outer casing 108, a plurality of outer casing through-holes 112, and further earpiece elements within outer casing 108, but obscured from view in FIG. 1A.

Bottom portion 104 includes a bottom-portion outer casing 120, a keypad including a plurality of keys 124, a display 126, and a wideband voice mouthpiece, referred to generally at 130. Mouthpiece 130 includes a portion of outer casing 120, a plurality of outer casing through-holes 134, and further mouthpiece elements within casing 120, but obscured from view in FIG. 1A.

Figure 1B:
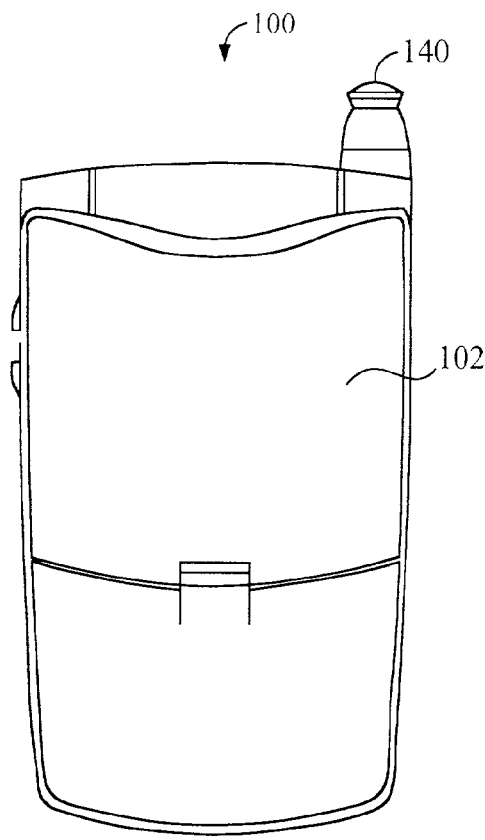
FIG. 1B is a front view of the wireless telephone of FIG. 1A in a collapsed or folded position.
Figure 1C:
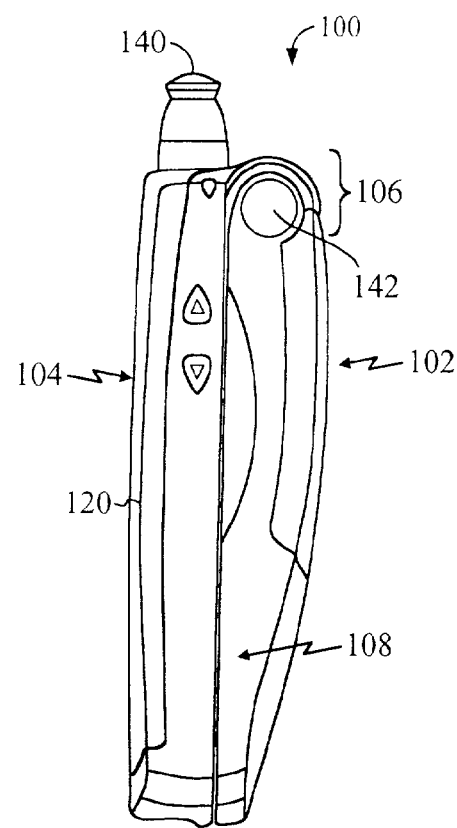
FIG. 1C is a side view of the wireless telephone of FIG. 1A in the collapsed position.
Figure 1D:
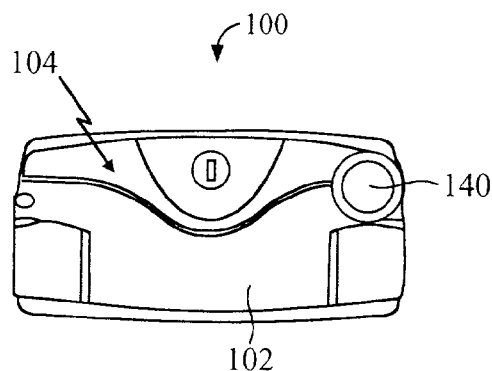
FIGS. 1D and 1E are top and bottom views of the wireless telephone of FIG. 1A, respectively.
Figure 1E:
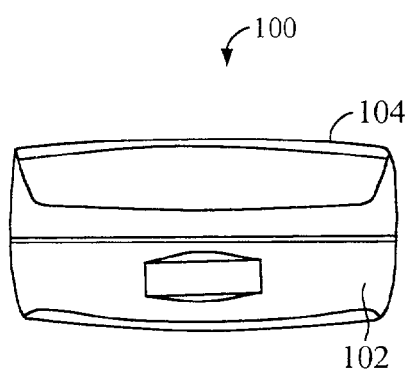
Figure 1F:
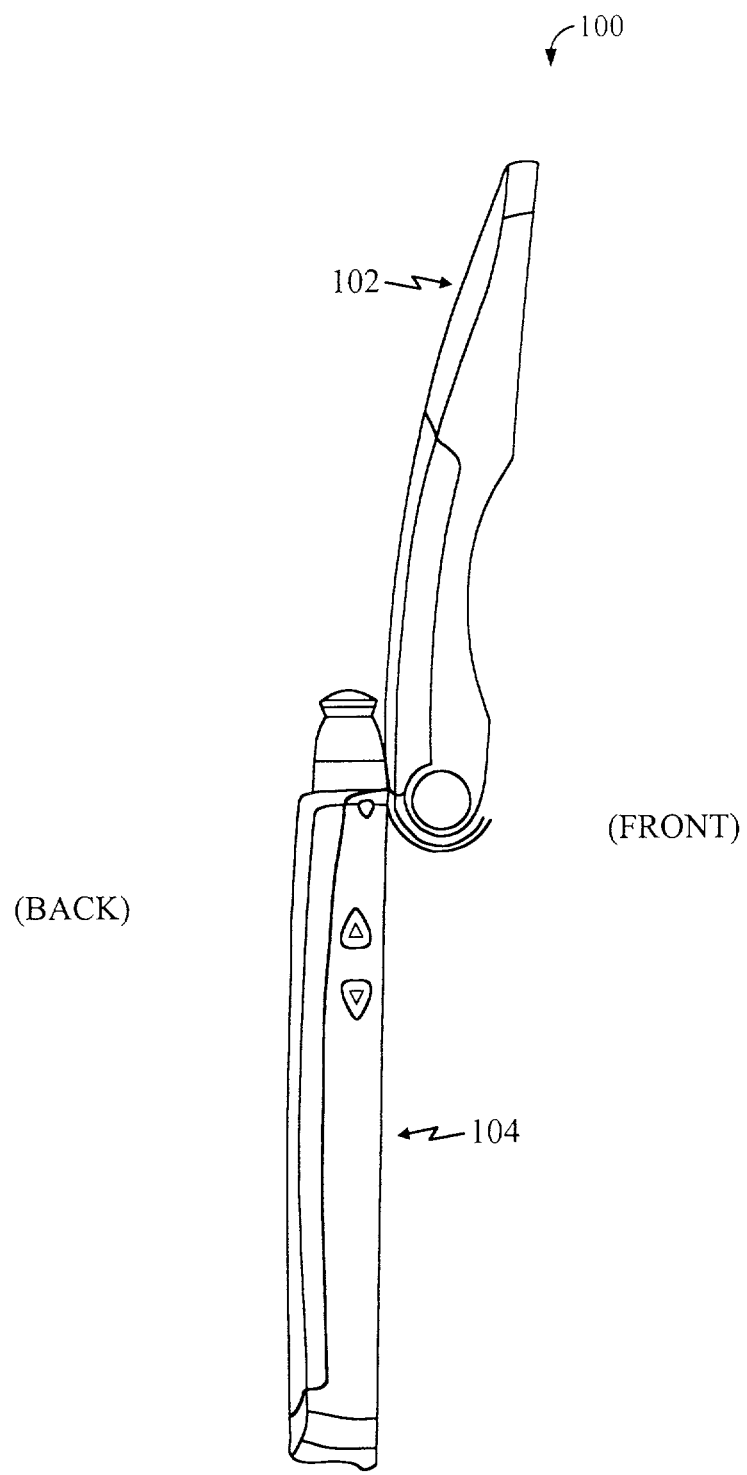
FIG. 1F is a side view of the wireless telephone of FIG. 1A in the open position.

FIG. 1B is a front view of wireless telephone 100 in the collapsed or folded position. As depicted in FIG. 1B, wireless telephone 100 also includes an antenna 140. FIG. 1C is a side view of wireless telephone 100 in the collapsed position. As depicted in FIG. 1C, wireless telephone 100 includes a hinge mechanism 142, as mentioned above in connection with FIG. 1A. FIGS. 1D and 1E are a top view and a bottom view of wireless telephone 100, respectively. FIG. 1F is a side view of wireless telephone 100 in the open position of FIG. 1A.

Mouthpiece 130 and earpiece 110 together represent a wideband voice electro-acoustic apparatus of wireless telephone 100. Mouthpiece 130 and earpiece 110 are each configured to support wideband voice communication in the acoustic frequency range of 200 Hz to 7000 Hz. To support such wideband voice operation, telephone mouthpiece 130 and telephone earpiece 110 each have an acoustic passband in the wideband voice frequency range of 200 Hz to 7000 Hz. The electro-acoustic apparatus will be described in detail below.

Wireless telephone 100 engages in full-duplex, wideband voice communication with other similarly equipped telephones. In a transmit direction, wireless telephone 100 (that is, mouthpiece 130) receives an acoustic signal 150 generated by a user of wireless telephone 100. Wireless telephone 100 processes acoustic signal 150 to produce an RF transmit signal 154 representative of the acoustic signal. Wireless telephone 100 transmits RF signal 154 using antenna 140. In a receive direction, wireless telephone 100 receives an RF signal 158 representative of an acoustic signal. Wireless telephone 100 recovers the acoustic signal represented in RF signal 158 using earpiece 160, and the earpiece radiates the recovered acoustic signal (represented as an acoustic signal 160 in FIG. 1).

Figure 2:
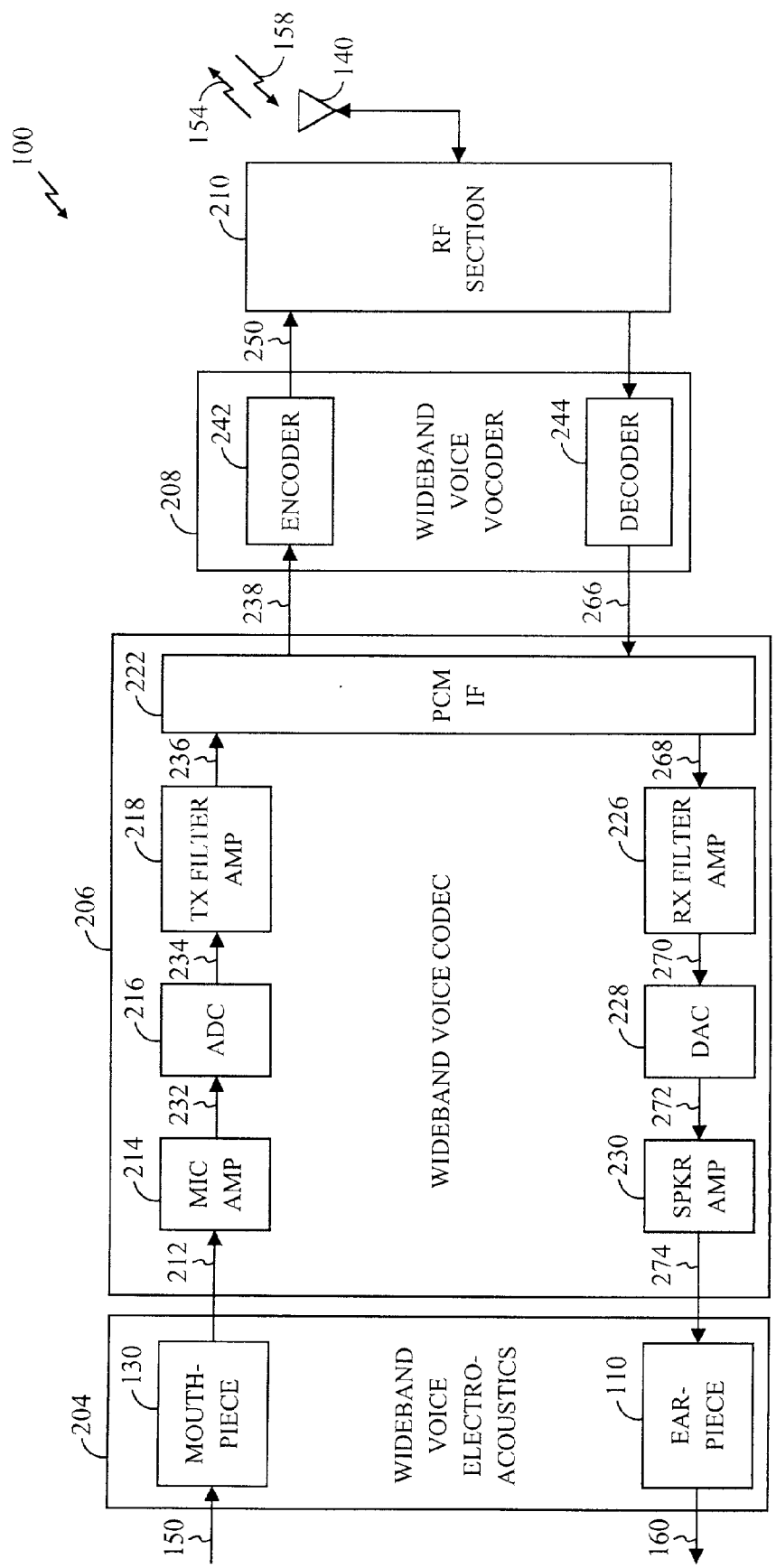
FIG. 2 is an example functional block diagram of the wireless telephone of FIG. 1A.

FIG. 2 is an example functional block diagram of wireless telephone 100. Wireless telephone 100 includes a wideband voice electro-acoustic apparatus 204, including wideband voice mouthpiece 130 and wideband voice earpiece 110. Wireless telephone 100 further includes a wideband voice Coder/Decoder (Codec) 206, a wideband voice encoder/decoder 208 (Vocoder 208), an RF Transmitter/Receiver 210 (also referred to as an RF Section 210), and antenna 140.

In operation, and in the transmit direction, mouthpiece 130 receives acoustic signal 150. Mouthpiece 130 converts acoustic signal 150 into an electrical analog signal 212, and provides signal 212 to Codec 206. To process signal 212 in the transmit direction, Codec 206 includes a microphone amplifier 214, an analog-to-digital converter (ADC) 216, a transmit filter/amplifier 218, and a Pulse Code Modulation (PCM) interface (IF) 222. To process signals in the receive direction, Codec 206 comprises PCM I/F 222, a receiver filter/amplifier 226, a digital-to-analog converter (DAC) 228, and a speaker amplifier 230. In the transmit direction, Codec 206 has a passband at least equal to the wideband voice passband of mouthpiece 130. Similarly, in the receive direction, Codec 206 has a passband at least equal to the wideband voice passband of earpiece 110.

In the transmit direction, microphone amplifier 214 amplifies analog signal 212 to produce an amplified analog signal 232. ADC 216 digitizes signal 232 at a predetermined sample rate, to produce a digital signal 234, including a series of digital samples representative of signal 232. To satisfy the Nyquist sampling/bandwidth criterion, the predetermined sample rate is at least two times 7000 Hz, which is the maximum frequency of the wideband voice frequency range. An example ADC sample rate used with ADC 216 is 16,000 Hz.

Transmit filter/amplifier 218 filters and amplifies digital signal 234 to produce a filtered/amplified digital signal 236. PCM IF 222 converts digital signal 236 into a PCM-encoded audio signal 238 having the example sample rate of 16,000 Hz. PCM IF 222 provides PCM-encoded digital audio signal 238 to Vocoder 208.

Vocoder 208 comprises an encoder 242 and a decoder 244. In the transmit direction, encoder 242 has a passband at least equal to the wideband voice passband of mouthpiece 130. Similarly, in the receive direction, decoder 244 has a passband at least equal to the wideband voice passband of earpiece 110. In the transmit direction, encoder 242 processes signal 238 to produce an encoded signal 250, including wideband vocoded audio/speech frames. Encoder 242 performs signal processing operations on signal 238, such as speech compression, background noise estimation and removal, voice activity detection, and forward error correction, for example. Transmitter/Receiver 210 frequency converts, and may additionally modulate, signal 238 to produce RF signal 154 and routes the RF signal to antenna 140.

In the receive direction, antenna 140 receives RF signal 158 and provides the signal to RF Receiver/Transmitter 210. RF signal 158 includes wideband vocoded speech/audio frames representative of an acoustic signal. RF Receiver/Transmitter 210 frequency converts, and may additionally demodulate, RF signal 158 to produce a vocoded signal 264, including wideband vocoded speech/audio frames. Vocoder decoder 244 processes/decodes signal 264 to reconstruct a PCM encoded signal 266. For example, Vocoder 244 performs signal processing operations that are reciprocal to the signal processing operations performed by Vocoder encoder 242.

Codec PCM IF 222 PCM decodes signal 264 to produce a digital signal 268 including digital samples having an example sample rate of 16,000 Hz. Receiver filter/amplifier 226 filters and amplifies digital signal 268 to produce a filtered/amplified digital signal 270. DAC 228 converts digital signal 270 to an analog audio signal 272. Speaker amplifier 230 amplifies signal 272 to produce an amplified analog audio signal 274. Earpiece 110 transduces signal 274 into acoustic signal 160, and radiates the acoustic signal.

As described above, in the transmit direction, mouthpiece 130 delivers audio information in the wideband frequency range of 200 Hz to 7000 Hz to the wireless telephone transmit chain elements, including Codec 206, encoder 242, RF section 210, and antenna 104. The overall transmit passband of wireless telephone 110 is limited by the transmit chain element (including mouthpiece 130) having the most narrow passband. Therefore, all of the transmit chain elements have passbands at least as wide as mouthpiece 130, thereby preserving the voice band quality delivered by mouthpiece 130 in RF transmit signal 154.

Similarly, in the receive direction, RF received signal 158 represents a voice band signal having wideband voice quality. Receive chain elements, including antenna 140, decoder 244, and Codec 206, deliver signal 274, representative of the voice band signal in RF signal 158, to earpiece 110. The overall receive passband of wireless telephone 110 is limited by the receive chain element (including earpiece 110) having the most narrow passband. Therefore, all of the receive chain elements have passbands at least as wide as earpiece 130, thereby preserving the voice band quality through the receive chain.

It is to be understood that the boundary line delimiting wideband voice electro-acoustic apparatus 204 in FIG. 2 may be extended to include microphone amplifier 214 and speaker amplifier 230, and any signal conditioning circuitry associated directly with the amplifiers, such as matching circuits, filters, pads, and so on. Thus, amplifiers 214 and 230 may be considered as part of mouthpiece 130 and earpiece 110, respectively.

Mouthpiece Frequency Response

Telephone mouthpiece 130 has a frequency response $F_M(f)$. Frequency response $F_M(f)$ is a measure of the consistency with which mouthpiece 130 transduces a given sound pressure level (for example, of acoustic signal 150) into an audio electrical signal (for example, signal 212) at different frequencies, denoted as f. Frequency response $F_M(f)$ is a function of the construction of mouthpiece 130 and of a particular microphone transducer used in the mouthpiece. Mouthpiece frequency response $F_M(f)$ has the general form:

$$F_M(f) = A_M(f)\theta M(f),$$

where f represents audio frequency,
$A_M(f)$ represents the Amplitude or Magnitude Response of the mouthpiece as a function of frequency f, and
$\theta_M(f)$ represents the Phase Response of the mouthpiece as a function of frequency f.

Amplitude Response $A_M(f)$ is expressed in decibels (dB) in accordance with the equation:

$$A_M(f)_{dB} = 20 \log_{10}(V_{out}(f)S_{in}(f)),$$

where $V_{out}(f)$ represents the voltage of electrical signal 212 as a function of frequency f, and
$S_{in}(f)$ (also referred to as $Spl_{in}(f)$) represents the sound pressure level of acoustic signal 154, that is transduced to the voltage $V_{out}(f)$ Amplitude Response $A_M(f)_{dB}$ represents a mouthpiece gain, as a function of frequency. The mouthpiece gain may be positive or negative. Positive gain represents true gain, that is, amplification, while negative gain represents loss or attenuation.

Figure 3:
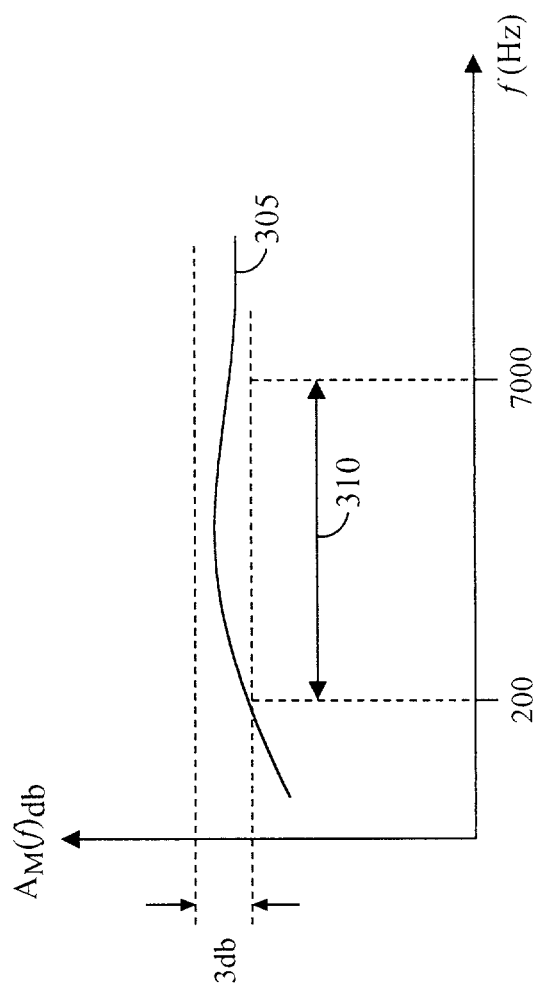
FIG. 3 is an example amplitude response plot for the wideband voice mouthpiece of the wireless telephone of FIG. 1A.

FIG. 3 is a plot of the amplitude response $A_M(f)_{dB}$ (y-axis) versus frequency f (x-axis) for mouthpiece 130. In other words, FIG. 3 is a gain plot for mouthpiece 130, as a function of frequency. The amplitude response, represented by a gain curve 305, has an amplitude passband 310 in the audio frequency range of 200 Hz to 7000 Hz. This means the gain of mouthpiece 130 is ideally flat across the audio frequency range of 200 Hz to 7000 Hz. In practice, the gain of microphone 130 is relatively flat. For example, the gain of microphone 130 varies less than 3 dB in the passband, that is, across the frequency range of 200 Hz to 7000 Hz.

In an arrangement of mouthpiece 130, in passband 310, mouthpiece 130 has a substantially linear response within a linear range of the mouthpiece. This means that at any given frequency in the passband, a given change in the input sound pressure level $S_{in}$ applied to mouthpiece 130 causes a proportional change in the output voltage $V_{out}$ produced by the mouthpiece. Outside of the mouthpiece linear response range, the mouthpiece may have other types of responses, such as a square law or a compressed response. However, such responses can cause audio distortion, and thus may have a negative impact on voice quality.

Earpiece Frequency Response

Telephone earpiece 110 has a frequency response $F_E(f)$. Frequency response $F_E(f)$ is a measure of the consistency with which earpiece 110 transduces electrical signal 274 into acoustic signal 160 at different frequencies. Frequency response $F_E(f)$ is a function of the construction of earpiece 110 and of a particular speaker transducer used in the earpiece. Earpiece frequency response $F_E(f)$ has the general form:

$$F_E(f) = A_E(f)\theta_E(f),$$

where f represents frequency,
$A_E(f)$ represents the Amplitude or Magnitude Response of the earpiece as a function of frequency f, and
$\theta_E(f)$ represents the Phase Response of the earpiece as a function of frequency f.

Amplitude Response $A_E(f)$ is expressed in decibels (dB) in accordance with the equation:

$$A_E(f)_{dB} = 20 \log_{10}(S_{out}(f)/V_{in}(f)),$$

where $S_{out}(f)$ (also referred to as $Spl_{out}(f)$) represents the sound pressure level of acoustic signal 160 generated by earpiece 110 using the speaker transducer, and $V_{in}(f)$ represents the voltage of electrical signal 274 at frequency f, that causes earpiece 110 to generate $S_{out}(f)$.

Amplitude Response $A_E(f)_{dB}$ represents an earpiece gain, as a function of frequency. The earpiece gain may be positive or negative. Positive gain represents true gain, that is, amplification, while negative gain represents loss or attenuation. The earpiece amplitude response $A_E(f)$ (and correspondingly, $A_E(f)_{dB}$) has an acoustic passband in the frequency range 200 Hz to 7000 Hz. Thus, earpiece 110 passes, that is, effectively transduces, acoustic signals in the frequency range of 200 Hz to 7000 Hz.

In an arrangement of earpiece 110, in the passband of the earpiece, the earpiece has a substantially linear response within a linear range of the earpiece. This means that at any given frequency in the passband, a given change in the input voltage level $V_{in}$ applied to earpiece 110 causes a proportional change in the output sound pressure level $S_{out}$ produced by the earpiece. Outside of the earpiece linear response range, the earpiece may have other types of responses, such as a square law or a compressed response. However, such responses can cause audio distortion, and thus may have a negative impact on voice quality.

Mouthpiece Apparatus

Figure 4A:
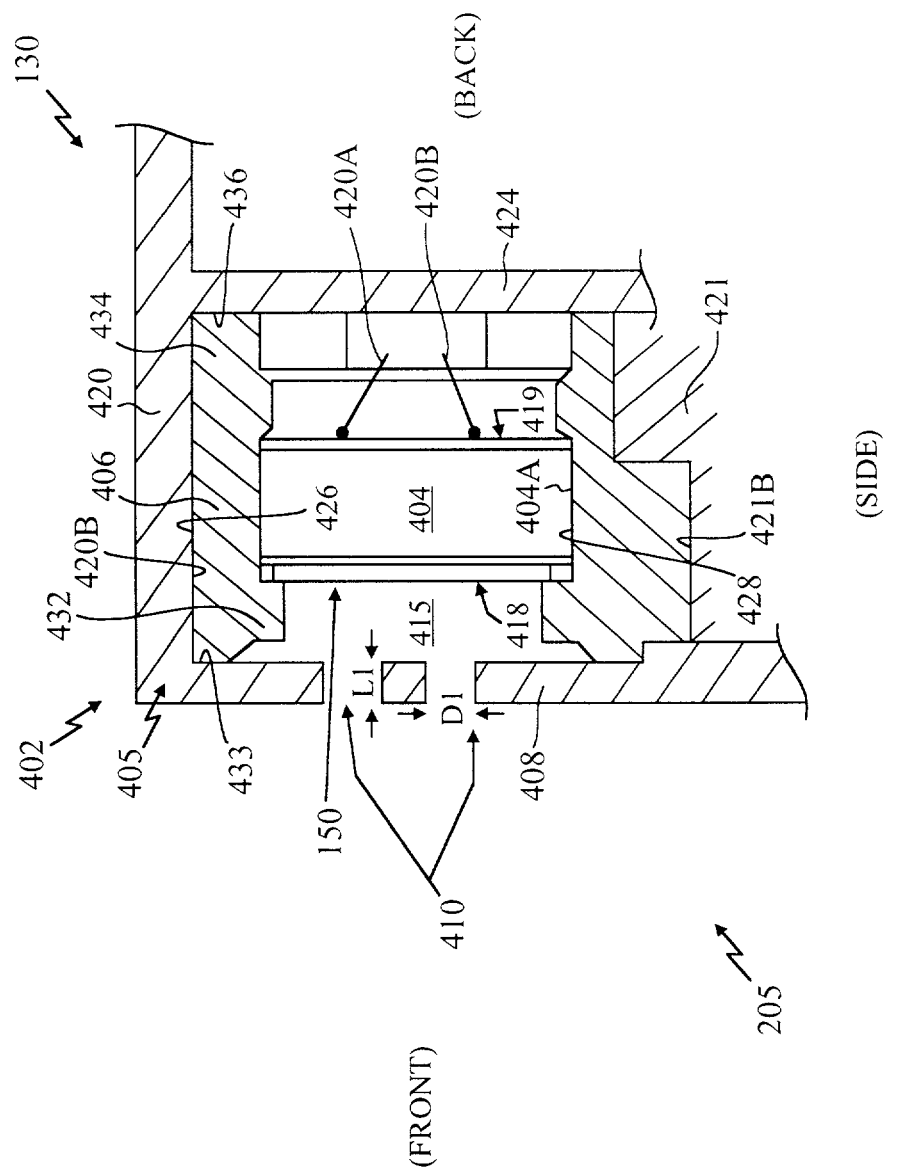
FIG. 4A is a cross-section side view of an example wideband voice mouthpiece construction corresponding to the wireless telephone of FIG. 1A, taken across a cut-line 4A-4A depicted in FIG. 1A.
Figure 4C:
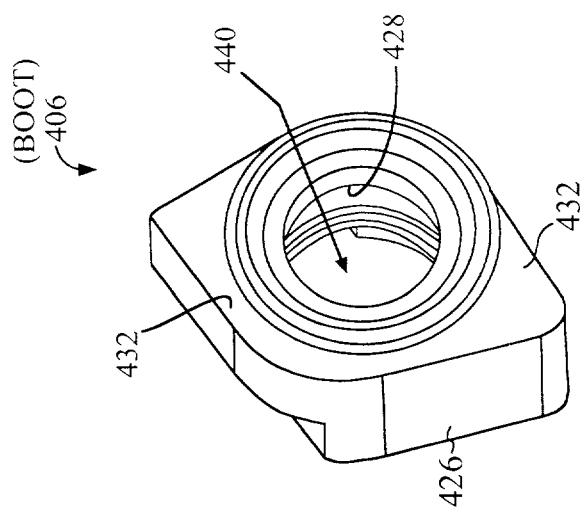
FIG. 4C is a perspective view of an example microphone boot used in the mouthpiece construction of FIG. 4A.
Figure 4B:
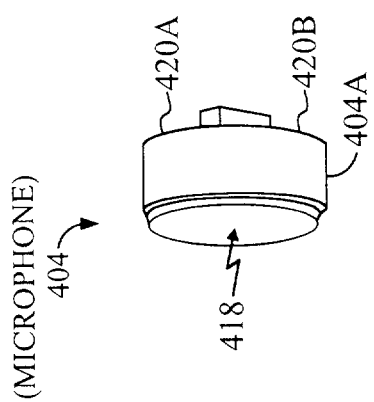
FIG. 4B is a perspective view of an example microphone transducer used in the mouthpiece construction of FIG. 4A.

FIG. 4A is a cross-section side view of an example construction of wideband voice mouthpiece 130, taken across a cut line 4A-4A depicted in FIG. 1A. Mouthpiece 130 includes an enclosure, referred to generally at 402, and a substantially cylindrically-shaped microphone 404, fixed within the enclosure, for converting acoustic signal 150 to electrical signal 212. FIG. 4B is a perspective view of microphone 404. Enclosure 402 and microphone 404 are configured and arranged to cause telephone mouthpiece 130 to have a passband in the frequency range of 200 Hz to 7000 Hz.

Enclosure 402 includes a protective outer casing, referred to generally at 405 (which corresponds to a portion of casing 120, mentioned above in connection with FIG. 1), and a substantially annularly-shaped microphone boot 406 fixed within the casing. Casing 405 can be made of a plastic composition or a metal/alloy composition, a combination of both, or any other suitably rigid material. Microphone boot 404 can be made of a rubber composition, or a plastic composition, or any other composition suitable for isolating microphone 404 from mechanical shock and vibration. FIG. 4C is a perspective view of microphone boot 406. With reference to FIGS. 4A-4C, microphone boot 406 holds microphone 404 in position within enclosure 402. Casing 405 includes a front wall 408 spaced-apart from and generally parallel to a substantially-planar front surface 418 of microphone 404 for receiving acoustic signal 150. Casing front wall 408 includes a plurality of through-holes 410 formed therein (which correspond to through-holes 134 mentioned above in connection with FIG. 1) to permit acoustic signal 150 to pass into enclosure 402, and to thereby impinge upon microphone surface 418. Microphone 404 transduces sound pressure impinging on front surface 418 into electrical signal 212. Thus, microphone 404 converts acoustic signal 150 into electrical signal 212. A pair of electrical leads 420a and 420b, connected to a back surface 419 of microphone 404, carry electrical signal 212 from the microphone to microphone amplifier 214 (of Codec 206, discussed above in connection with FIG. 2).

Outer casing 405 further includes a back wall 424 spaced-apart from and generally parallel to casing front wall 408. Outer casing 405 further includes a side wall 420 spaced-apart from and generally parallel to an opposing enclosure wall structure 421 (also referred to as an enclosure inner wall 421). Enclosure wall structure 421 may be a wall or an edge of a circuit board within casing 405, or any other structure suitable for forming a wall like structure of enclosure 402. Microphone boot 406 includes an outer side wall 426 for frictionally engaging an inner surface 420b of casing side wall 420, and an inner surface 421b of enclosure wall structure 421. A front portion 432 of microphone boot 406 frictionally engages a peripheral inner portion 433 of casing front wall 408. A back portion 434 of microphone boot 406 frictionally engages a peripheral inner portion 436 of casing back wall 424. Microphone boot 406 also includes an inner side wall segment 428, intermediate boot front and back portions 432 and 434, defining a substantially cylindrically-shaped aperture 440 (depicted in FIG. 4C) for receiving microphone 404. A side wall 404a of microphone 404 frictionally engages boot inner side wall segment 428.

Casing front wall 408 and microphone boot front portion 432 together define a substantially cylindrically-shaped air cavity 415 within enclosure 402 and adjacent microphone front face 418. Air cavity 415 and through-holes 410 are sized to cause telephone mouthpiece 130 to have an acoustic resonance at a frequency sufficiently far away from the wideband voice frequency range of 200 Hz to 7000 Hz, so that the mouthpiece frequency response passband is relatively flat in the wideband voice frequency range. For example, the acoustic resonance occurs at a frequency between 9000 Hz and 10,000 Hz when air cavity 415 has a volume V1 approximately equal to $1.83E10^{-8}$ meters$^3$, and through-holes 410 have a through-length L1 approximately equal to 1.5 millimeters and a diameter D1 approximately equal to 1 millimeter.

In the example arrangement of mouthpiece 130 described above, casing 405 and microphone boot 406 are individual components that are press-fit together to form enclosure 402. In an alternative arrangement, the enclosure is an integrally formed component, such as an injection molded component, providing the shape and functionality of casing 405 and boot 406, combined.

A set of example specifications for microphone 404 is set forth in Table 1, below.

TABLE 1

| | |
|---|---|
| Directional Characteristics | Omni-directional |
| Sensitivity | −44 dB +/− 3 dB @ 1 kilohertz (kHz) (0 dB = 1 Volt (V)/Pascal (Pa)), Load Resistance RL = 2.2 Kilo (K) ohm, Vcc = 1.8 V |
| Signal (S)/ Noise (N) Ratio | 58 dB mm @ 1 Khz (1 Pa, A weight) A weight = ANSI S1.4, where ANSI = American National Standards Institute |
| Max Input Sound Level | 120 decibel-sound pressure level (dBspl) |
| Operating voltage | 1.8 V (1.7 V to 2 V) |
| Circuit current | 500 micro Amperes (uA) max (Vcc = 1.8 V) |
| Internal Capacitor | 33 picoFarad (pF) |
| Frequency Response | Relatively flat frequency response from 100 Hz to 8 Khz |

The microphone used in the wideband voice mouthpiece is not limited to the above specifications. Also, the microphone may be a cardoid microphone, a noise canceling microphone, or any other type of microphone, such that the microphone and mouthpiece enclosure combine to produce an it overall mouthpiece passband in the range of at least 200 Hz to 7000 Hz, as described above.

Figure 4D:
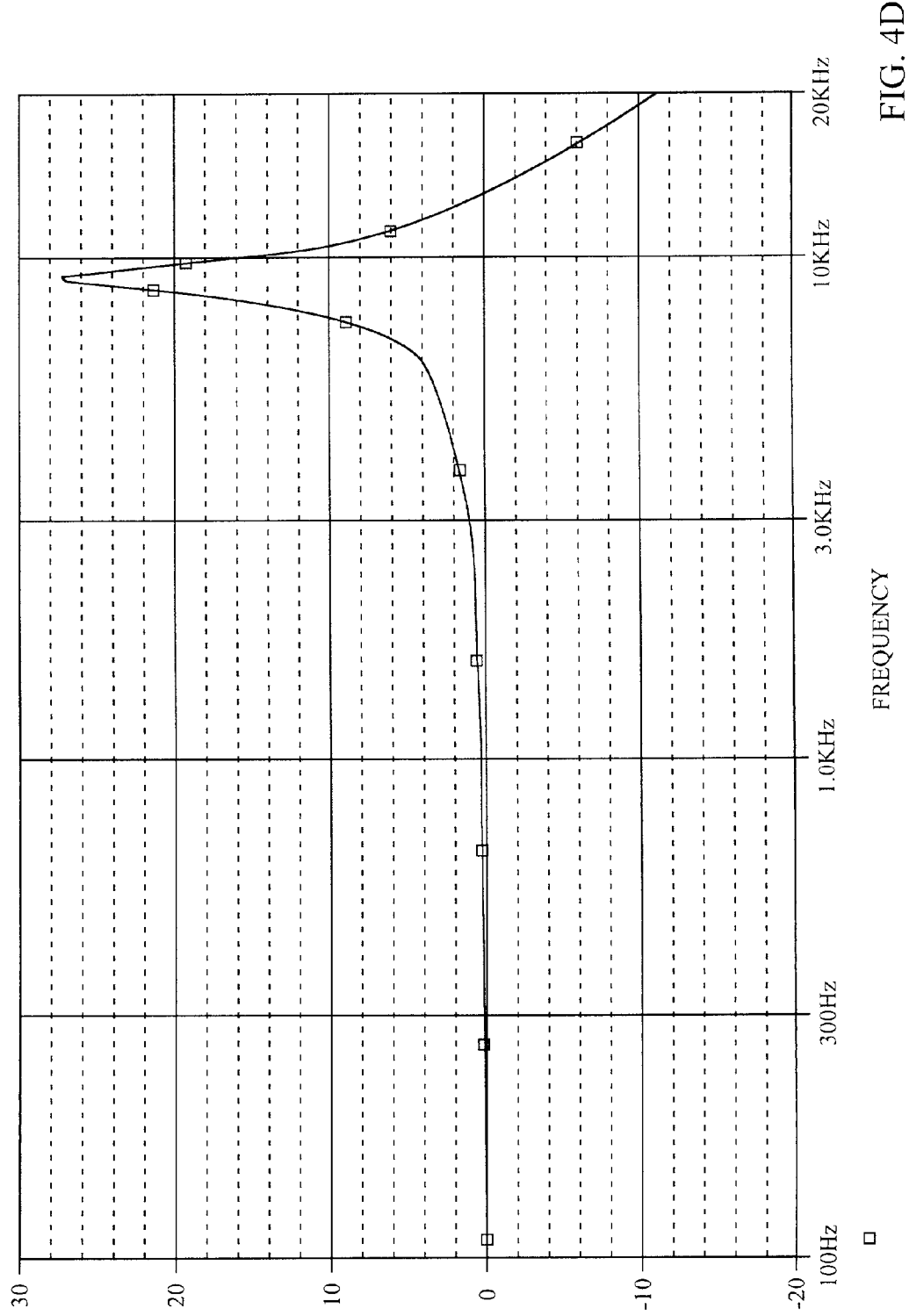
FIG. 4D is an amplitude response plot of the microphone boot of FIGS. 4A and 4C.

FIG. 4D is an amplitude response plot of microphone boot 406. Microphone boot 406 exhibits a substantial acoustic resonance peak at a frequency just below 10,000 Hz.

Earpiece Apparatus

Figure 5A:
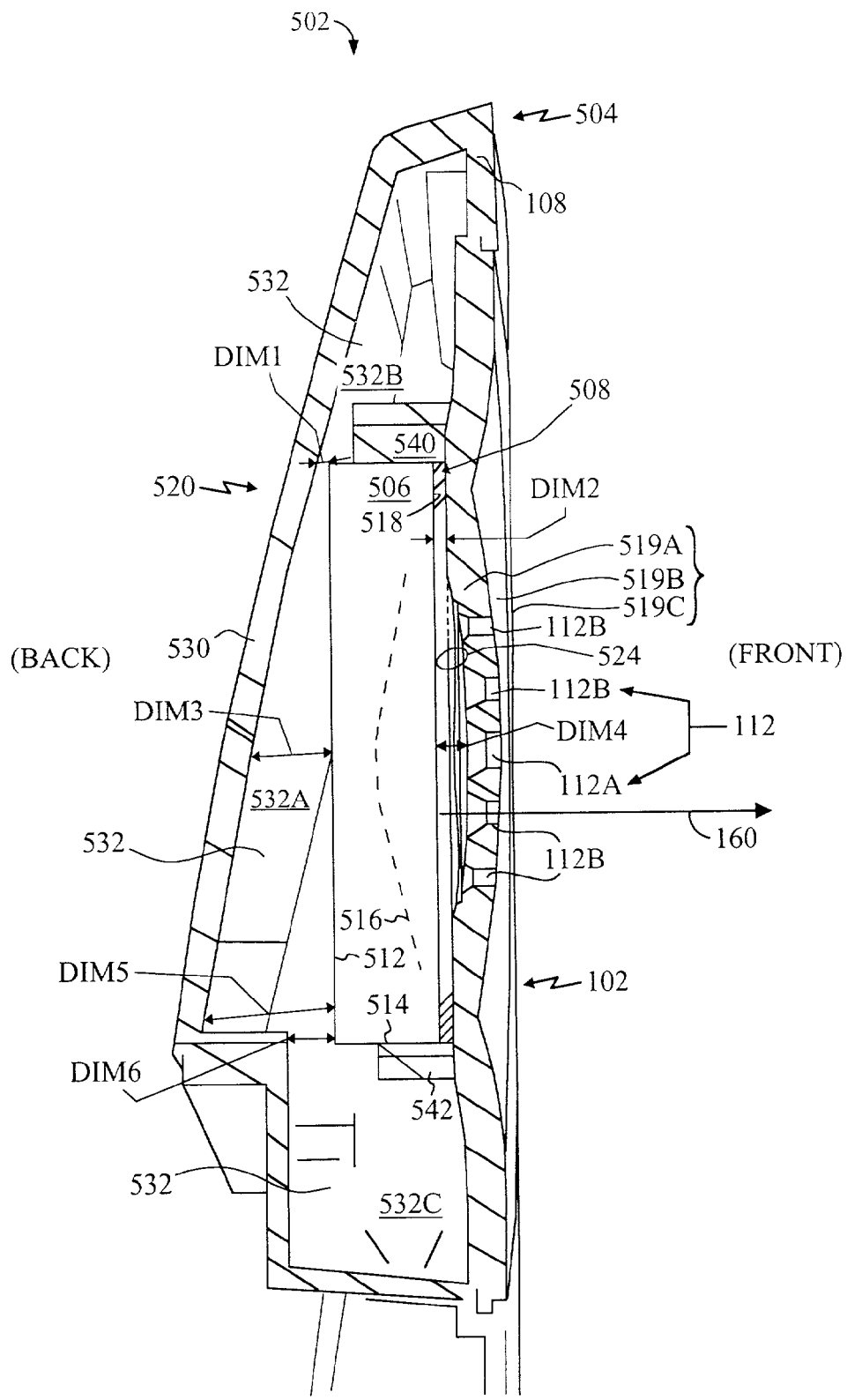
FIG. 5A is a cross-section side view of a first example wideband voice earpiece construction corresponding to the wireless telephone of FIG. 1A, taken across a cut-line 5A-5A depicted in FIG. 1A.
Figure 5B:
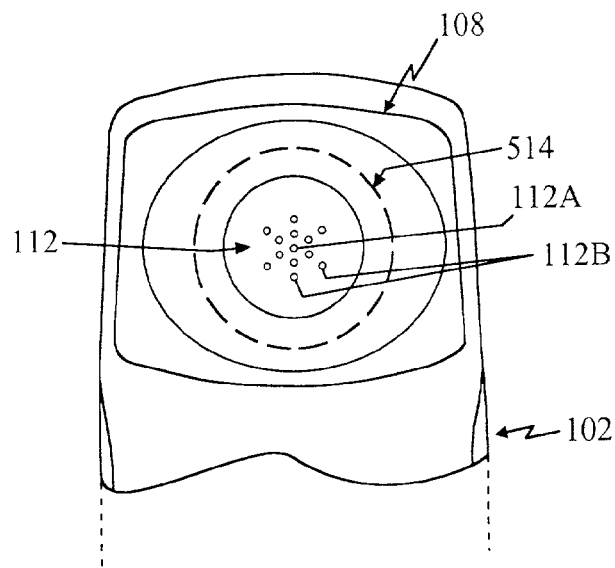
FIG. 5B is a front view of the earpiece construction of FIG. 5A.

FIG. 5A is a cross-section side view of an example earpiece construction 502 (also referred to as earpiece 502) for earpiece 110, taken along a cut-line 5A-5A depicted in FIG. 1A. FIG. 5B is a front view of earpiece 502, similar to FIG. 1A. With reference to FIGS. 5A and 5B, earpiece 502 includes an enclosure, referred to generally at 504, a substantially cylindrically-shaped speaker transducer (or just "speaker") 506 fixed within enclosure 504, and an annular gasket 508 for sealing the speaker against portions of the enclosure.

Enclosure 504 and speaker 506 are configured and arranged to cause earpiece 502 to have an amplitude response $A_E(f)$ that is similar to a lowpass filter amplitude response. Amplitude response $A_E(f)$ includes an acoustic passband in the wideband voice frequency range of 200 Hz to 7000 Hz, and a stopband corresponding to frequencies greater than 7000 Hz. The passband passes frequencies in the range of 200 Hz and 7000 Hz, whereas the stopband rejects or substantially attenuates frequencies greater than 7000 Hz.

Speaker 506 includes a front face 510, a generally planar back face 512 spaced-apart from the front face, and a curved side wall 519 between the speaker front and back faces. Speaker 506 also includes a movable diaphragm 516 (depicted in dotted line in FIGS. 5A and 5B) for generating an acoustic signal, such as acoustic signal 160, and for radiating the acoustic signal away from speaker front face 510.

Enclosure 504 includes a front portion, referred to generally at 518, and a back portion, referred to generally at 520, spaced-apart from each other. Speaker 506 and gasket 508 are fixed between the enclosure front and back portions 518 and 520. Enclosure front portion 518 includes several front wall portions 519a, 519b and 519c (referred to generally as front wall portions 519 or front walls 519), extending in a generally vertical direction and spaced-apart from speaker front face 510. Front wall portions 519a-c together form a relatively complex, contoured shape of earpiece front portion 518. Annular gasket 508 seals a ring-shaped peripheral portion 518 of speaker front face 510 against enclosure front portion 519, specifically, against front wall portion 519a. Front wall portions 519 and gasket 508 together form a front air cavity 524 adjacent speaker front face 510, the front air cavity having a relatively complex, step-like configuration formed by the front wall portions. Enclosure 504 can be made of a plastic composition or a metal/alloy composition, a combination of both, or any other suitably rigid material. Gasket 508 can be made of a rubber composition, or a plastic composition, or any other material suitable for sound-sealing front air cavity 524.

Enclosure front portion 518 includes through-holes 112 (also depicted in FIG. 1A) formed therein to permit acoustic signal 160 generated at speaker front face 510 to exit enclosure 504. Through-holes 112 include a central, relatively large diameter through-hole 112a and multiple other small diameter through-holes 112b, arranged around the large diameter through-hole.

Back portion 520 includes a back wall 530 angularly offset relative to front wall portions 519, and defining a back air cavity, referred to generally at 532, with respect to speaker 506. Back air cavity 532 includes a first back air cavity portion 532a, having a substantially triangle-shaped cross-section, adjacent speaker back surface 512. Back air cavity 532 also includes second and third back air cavity portions 532b and 532c above and below the first back air cavity portion in the vertical direction, respectively, and adjacent speaker side wall 514.

First and second opposing insets 540 and 542 frictionally engage speaker side wall 519, to fix the speaker in place within enclosure 504. In addition, or alternatively, an adhesive may be used to fix speaker 506 against insets 540 and 542. Also, a pair of electrical leads (not shown in the FIGs.) carries electrical signal 274 (which may a differential signal) from amplifier 230 (of Codec 206) to speaker 506.

Earpiece through-holes 112, front air cavity 524, and back air cavity 532, are all sized and oriented in relation to each other to cause earpiece 502 to have the above-mentioned low pass filter response. In an example implementation, large through-hole 112a has a diameter D2 of approximately 1.5 millimeter(s) (mm), each of the other small through-holes 112b has a diameter D3 (vertical dimension in FIG. 5A) of approximately 1 mm, front air cavity 524 has a volume V2 of approximately 0.4 cubic centimeters, and back air cavity 532 has a total volume V3 of approximately 8.4 cubic centimeters. Also, all of through-holes 112 have a through-length L2 (horizontal dimension in FIG. 5A) of approximately 1.5 millimeter.

Earpiece 502 has the following example dimensions: dim1=0.45 mm; dim2=0.45 mm; dim3=3.13 mm; dim4=1.2 mm; dim5=5.0 mm; and dim6=1.8 mm.

A set of example specifications for speaker 506 is set forth in Table 2, below.

TABLE 2

| Type | Dynamic Leak Tolerant Speaker |
|---|---|
| Sensitivity | 106 dBspl +/− 3 dB @ 1 milliwatt (mW)/1 Khz in a Type 1 (318) sealed ear coupler ("Type 1" is specified below) |
| Sensitivity Loss | 4 to 6 dB @ 1 mW/1 Khz in a Type 3.2 (low leak) ear coupler ("Type 3.2" is specified below) |
| Max Input Power | 35 mW |
| Total Harmonic Distortion (THD) + Noise (N) | <5% @ 16 mW/1 Khz in a Type 1 (318) sealed ear coupler |
| Rated Impedance | 32 ohms |
| Frequency Response | Relatively flat frequency response from 150 Hz to 7 kHz in a HATS ear coupler ("HATS" is specified below) |

The speaker used in the wideband voice earpiece is not limited to the above specifications.

Figure 6:
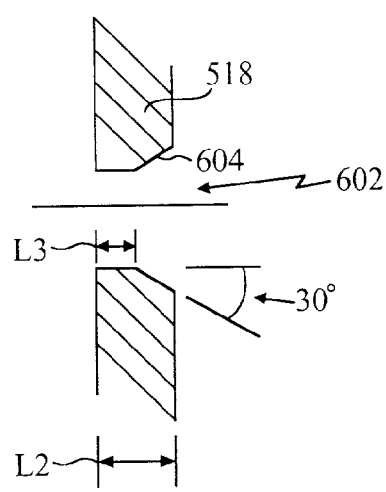
FIG. 6 is a cross-section side view of an example earpiece through-hole taken from the earpiece construction of FIG. 5B.

FIG. 6 is a cross-section view of an example through-hole 602 representative of each of the through-holes 112. Through-hole 602 includes a bevel 604 having a 30° slant, as indicated in FIG. 6. Through-hole 602 has an example non-beveled through-hole length portion L3 of approximately 0.2 mm.

Figure 7:
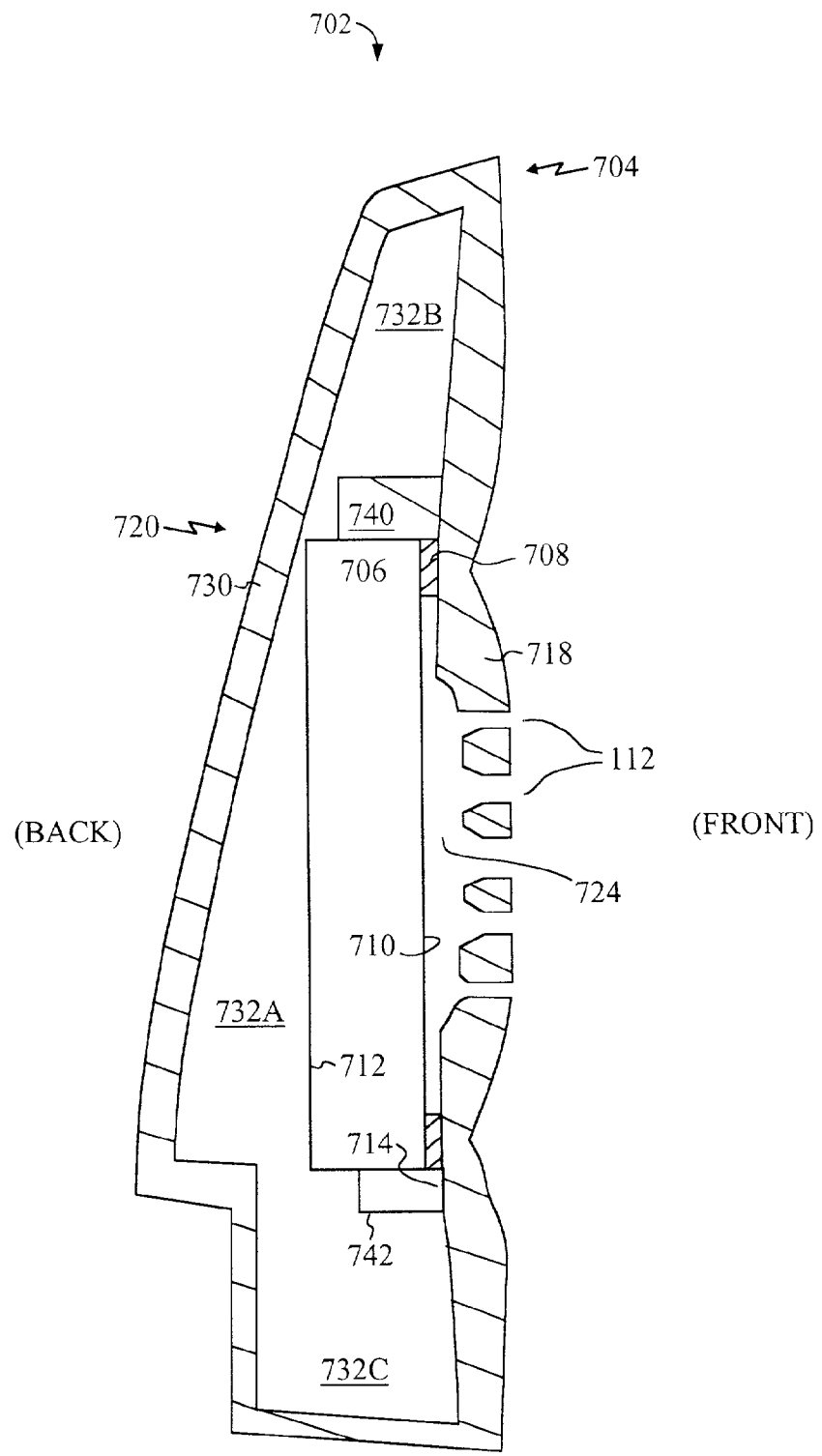
FIG. 7 is a cross-section side view of a second example wideband voice earpiece construction.

FIG. 7 is a cross-section side view of a second example earpiece construction 702 (also referred to as earpiece 702) for earpiece 110. The reference numerals of elements in FIG. 7 are increased by "200" with respect to their corresponding elements in FIG. 5. Earpiece 702 and earpiece 502 are similar to each other, the principal difference between the two being that earpiece 702 includes a front portion 718 having a shape that is substantially simplified in comparison to the shape of front portion 518 of earpiece 502. Earpieces 502 and 702 have substantially equivalent amplitude responses.

Measured Amplitude Responses

The amplitude responses of mouthpiece 130 and earpiece 110, as incorporated in wireless telephone 110, have been measured using industry standardized equipment and techniques, including:

1. a Head and Torso Simulator (HATS) mouth simulator (or coupler) and ear simulator (or coupler), in accordance with the standards ITU-T P.57, ITU-T P.58 or IEC959 or B&K Type HATS 4128C low leak;

2. a Loudness Rating Guard Ring (LRGP) position mouth simulator/Testhead, part no. Type 4602B, provided by Bruel & Kjaer headquartered in Denmark, and also operating out of Georgia, in the United States of America;

3. a Type 1 sealed ear coupler or simulator, in accordance with the standards ITU-T P.57 or IEC318 or B&K Type 4185; and 4. a Type 3.2 low leak ear coupler, in accordance with the standards ITU-T P.57 or IEC318 or B&K Type 4195 low leak.

Mouthpiece Amplitude Response

Figure 8A:
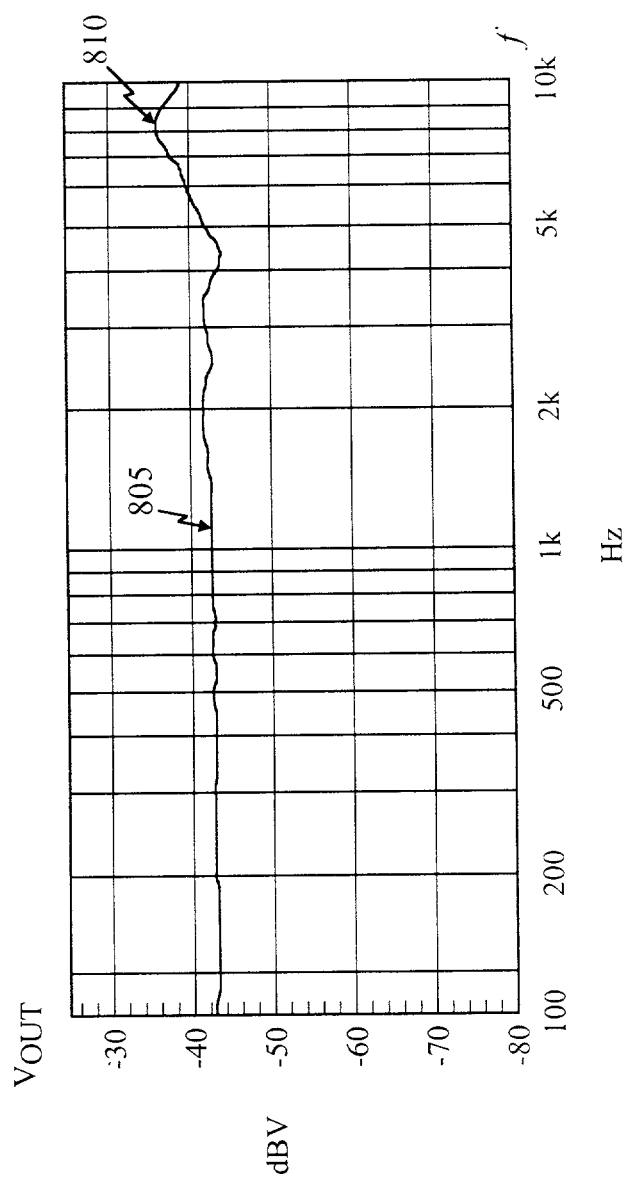
FIG. 8A is a first example amplitude response plot for the wideband voice mouthpiece construction of FIG. 4A.

FIG. 8A is an amplitude response plot for mouthpiece 130, produced using the HATS coupler specified above. Unlike the gain plot of FIG. 3, FIG. 8A is a plot of $V_{Out}$ (represented in decibel-Volts (dBV)) versus frequency f (in Hz). A voltage response curve 805 represents the amplitude response of mouthpiece 130, since curve 805 corresponds to a sound pressure being applied to mouthpiece 130, where the sound pressure has a constant (that is flat) amplitude across the frequency range depicted in FIG. 8A. A frequency swept input sound pressure level ($S_{in}$) of 88 dBspl (or −6 dBPa) across frequency was used to generate the plots of FIGS. 8A and 8B.

Voltage response curve 805 includes an acoustic passband in the wideband voice range 200 Hz to 7000 Hz. The output level produced by (and thus, the gain of) mouthpiece 130 varies less than 3 dB in amplitude in the wideband voice frequency range of 200 Hz to 7000 Hz. Also, voltage response curve 805 includes an acoustic resonance peak 810 between 9000 Hz and 10,000 Hz. The frequency of resonance peak 810 results from the construction of mouthpiece 130, for example, from the combination of diameter D1 and length L1 of through-holes 410, air volume V1 of air cavity 415, and the frequency response of microphone 404.

Figure 8B:
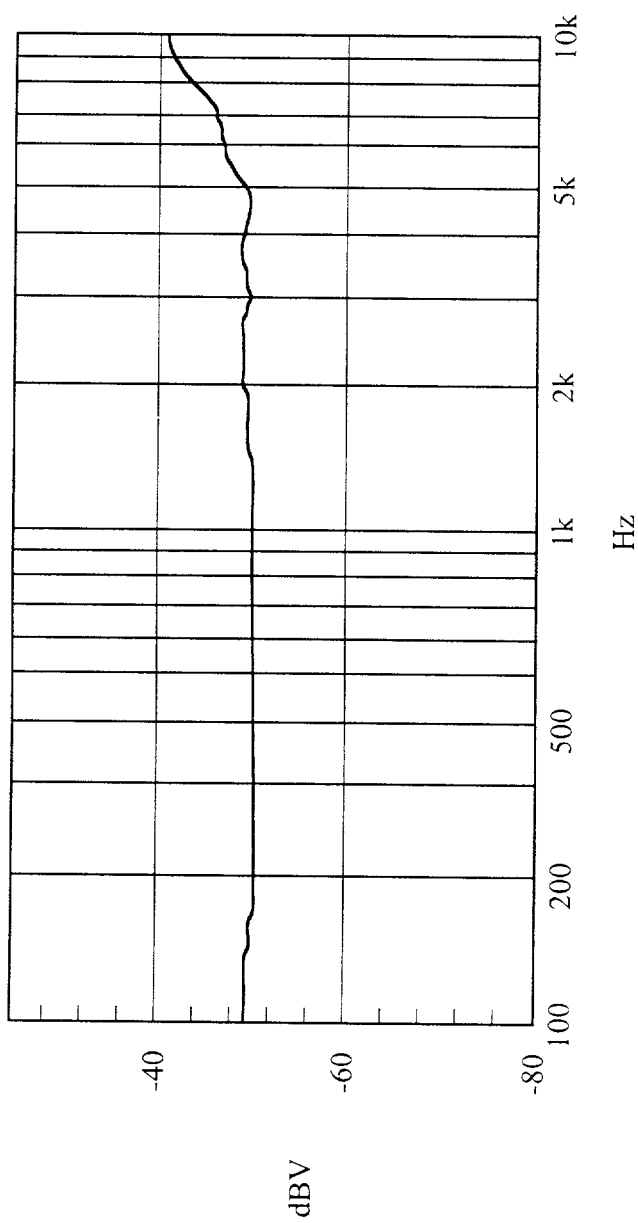
FIG. 8B is a second example amplitude response plot for the wideband voice mouthpiece construction of FIG. 4A.

FIG. 8B is an amplitude response plot for mouthpiece 130, produced using the Testhead LGRP simulator.

Earpiece Amplitude Response

Figure 9A:
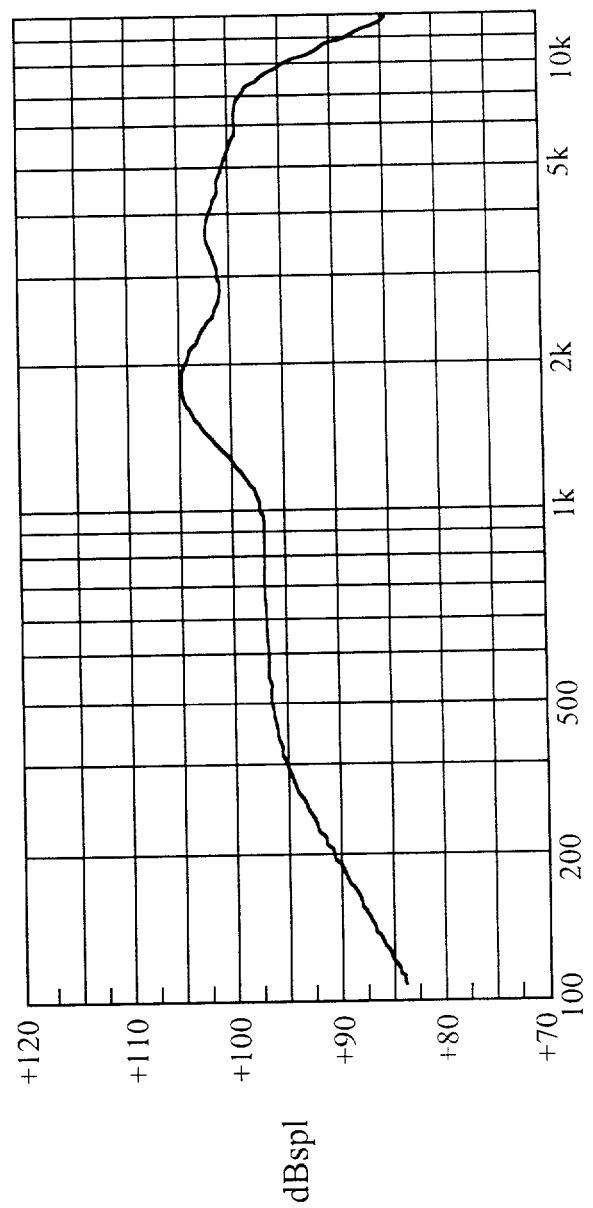
FIG. 9A is a first example amplitude response plot for the earpiece constructions of FIGS. 5A and 7.
Figure 9B:
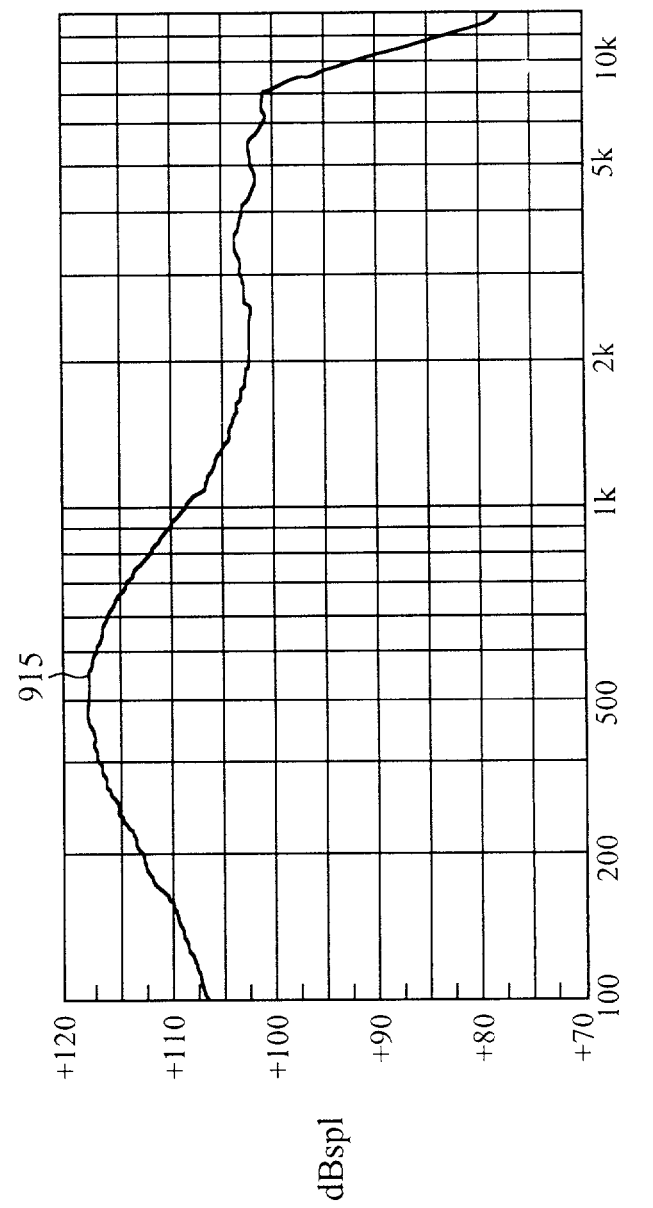
FIG. 9B is a second example amplitude response plot for the earpiece constructions of FIGS. 5A and 7.
Figure 9C:
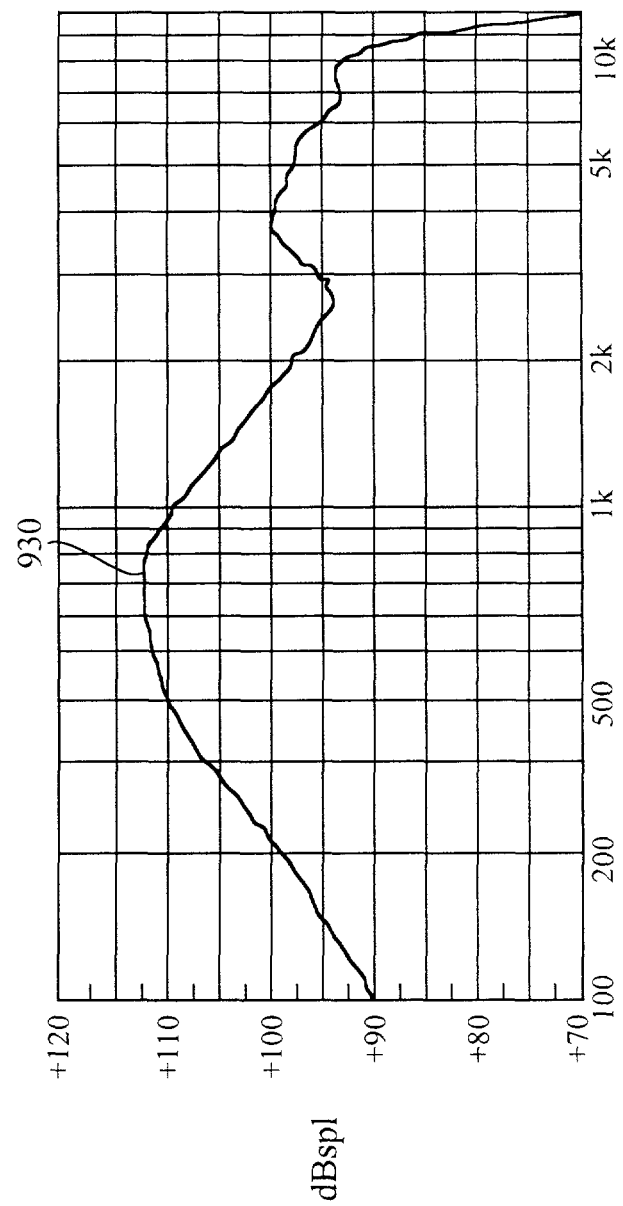
FIG. 9C is a third example amplitude response plot for the earpiece constructions of FIGS. 5A and 7.

Each of FIGS. 9A, 9B and 9C is an example plot of $S_{out}$ expressed in decibel-sound pressure level (dBspl) vs. frequency for earpieces 502 and 702 (that is, for the two embodiments of earpiece 130 described above). Each plot represents an earpiece amplitude response since each plot corresponds to a voltage being applied to the earpiece, where the voltage has a constant (that is flat) amplitude across the frequency range depicted in the plot. A frequency swept input voltage ($V_{in}$) of 0.45 Volts root-mean-square (RMS) was used to generate the plots of FIGS. 9A-9C.

FIG. 9A is an amplitude response plot for earpieces 502 and 702, which correspond to earpiece 130, produced using the HATS coupler and a simulated outer ear portion, also known as a pinna.

FIG. 9B is an amplitude response plot for earpieces 502 and 702, produced using the Testhead with a Type 1 sealed coupler, as specified above. The amplitude response of FIG. 9B includes a boosted frequency response 915 in the base frequency range of 200 Hz to 900 Hz, approximately.

FIG. 9C is an amplitude response plot for earpieces 502 and 702, produced using the Testhead with a Type 3.2 low leak coupler, as specified above. The amplitude response of FIG. 9C includes a boosted frequency response 930 in the base frequency range of 200 Hz to 1500 Hz, approximately.

Among the earpiece amplitude responses of FIGS. 9A, 9B and 9C the amplitude response of FIG. 9A is most realistic because of the use of the simulated pinna. On the other hand, the boosted base frequency responses depicted in the plots of FIGS. 9B and 9C result from relatively unrealistic tightly ear sealed and very low leak conditions, because such tight ear sealing is unrealistic for typical wireless telephone usage. For example, such tight ear sealing may be unrealistic because of the design and shape of the wireless telephone.

End-to-End Wideband Voice Call

Figure 10:
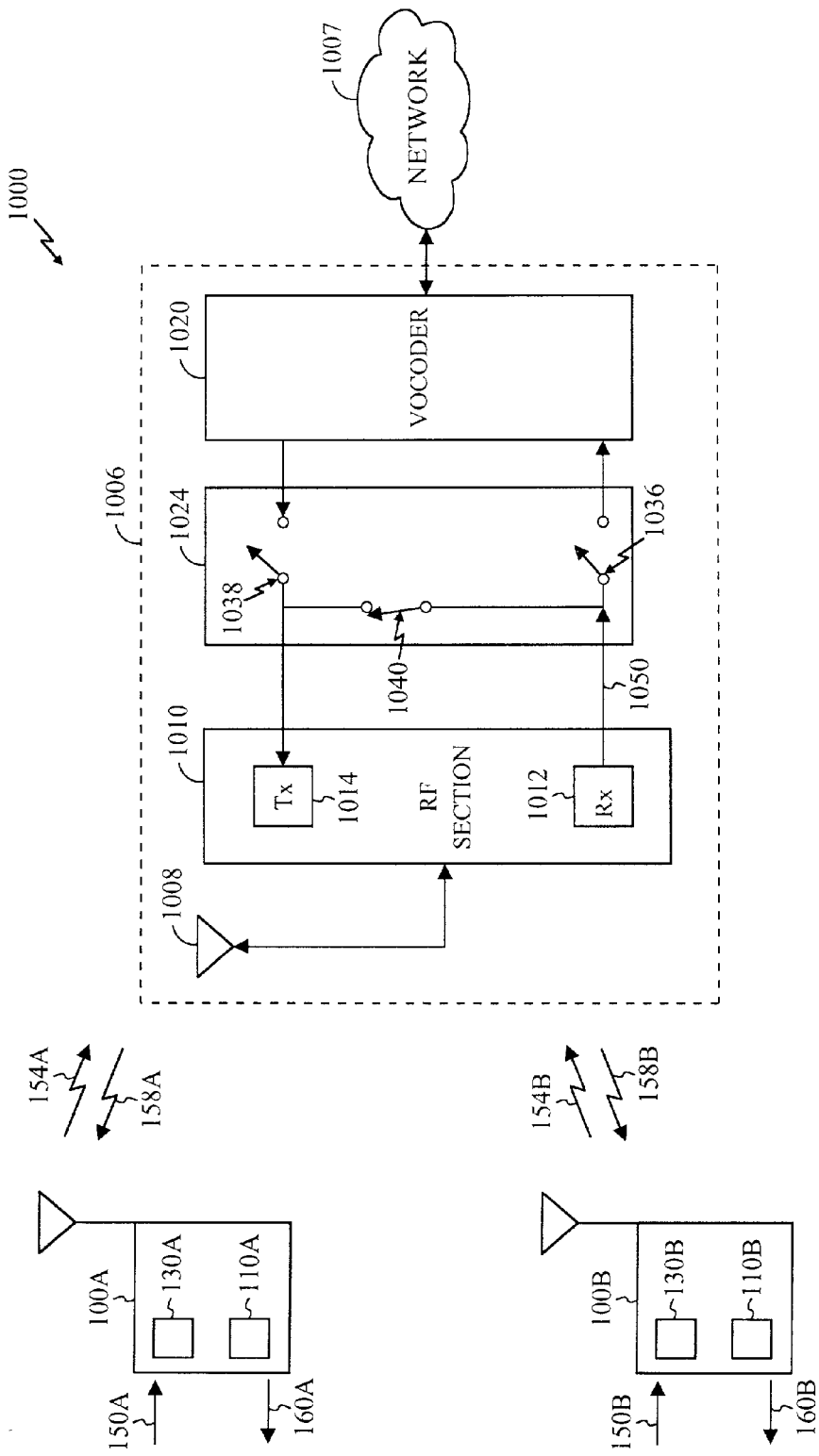
FIG. 10 is an example system for supporting an end-to-end wideband voice telephone call using wideband voice equipped wireless telephones.

FIG. 10 is an example system 1000 for supporting an end-to-end wideband voice telephone call. System 1000 includes first and second wideband voice equipped wireless telephones 100a and 100b, and a remote station 1006 (such as a base station) coupled to a network 1007, such as the Public Switched Telephone Network (PSTN). Wireless telephones 100a and 100b include the wideband voice elements described above in connection with FIG. 2, for example, electro-acoustic portion 204, Codec 206 and Vocoder 208.

Remote station 1006 includes an antenna 1008 coupled to an RF section 1010 having a receiver 1012 and a transmitter 1014. Remote station 1006 further includes a Vocoder 1020 coupled to RF section 1010 through a switch network or matrix 1024. Switch network 1024 includes a receive switch 1036 coupled between receiver 1012 and Vocoder 1020, a transmit switch 1038 coupled between Vocoder 1020 and transmitter 1014, and a Vocoder bypass switch 1040 coupled between an input of receive switch 1036 and an output of transmit switch 1038, and thus between an output of receiver 1012 and an input of transmitter 1014 of RF section 1010 (as depicted in FIG. 10).

Receive switch 1036 can be selectively opened and closed to selectively pass a received signal from receiver 1012 to Vocoder 1020 and to block the signal, respectively. Similarly, transmit switch 1038 can be selectively opened and closed to pass an encoded signal from Vocoder 1020 to transmitter 1014 and to block the signal, respectively. Vocoder bypass switch 1040 can be selectively opened and closed to pass the received signal directly from receiver 1012 to transmitter 1014 and to block the signal, respectively. When bypass switch 1040 is closed and receive and transmit switches 1036 and 1038 are both opened, as depicted in FIG. 10, remote station 1006 is in a bypass configuration. In the bypass configuration, a received signal is routed directly from receiver 1012 to transmitter 1014, and Vocoder 1020 is thereby bypassed.

During an end-to-end telephone call between respective users of wireless telephones 100a and 10b, remote station 1006 is placed in the bypass configuration. In a first direction, wireless telephone 100a receives acoustic signal 150a. Wireless telephone 100a produces an RF transmit signal 154a from acoustic signal 150a, and transmits RF signal 154a to remote station 1006. Remote station antenna 1008 delivers signal 154a to receiver 1012. Receiver 1012 frequency converts signal 154a, to produce a received signal 1050. Receiver 1012 delivers signal 1050 directly to transmitter 1014 through closed bypass switch 1040, as described above. Transmitter 1014 frequency converts signal 1050 to produce an RF signal 158b, and delivers RF signal 158b to antenna 1008. Antenna 1008 transmits RF signal 158b to wireless telephone 10b. Wireless telephone 100b processes RF signal 158b to produce an acoustic signal 160b. The same operation is used in the opposite direction (using signals 150b, 154b, 158a, and 160a) to achieve full duplex wideband voice communication.

CONCLUSION

While various embodiments of the present invention have been described above, it should be understood that they have been presented by way of example only, and not limitation.

For example, the wideband voice electro-acoustic apparatus of the present invention has been described in connection with wireless telephone 100, as depicted in FIGS. 1A-1F. However, it is to be understood that the wideband electro-acoustic apparatus of the present invention may be housed in a wireless telephone having a substantially different size and shape, and that may or may not be a folding-type telephone. Moreover, a wireless telephone may include only the earpiece of the present invention, or alternatively, only the mouthpiece of the present invention. Also, the present invention may be used with a non-wireless telephone device, for example, with a telephone device connected to the PSTN using telephone wires. Even further, the present invention applies to telephone headsets and hands-free car kits.

Aesthetic design, space, size, and weight considerations influence the overall shape of a wireless telephone 100, and thus, the shapes of the earpiece front and back air cavities (for example, front and back air cavities 524 and 532), and the shape of the mouthpiece air cavity (for example, air cavity 415). However, it is to be understood that the present invention is not limited to such exemplary shapes. For example, the shape of each of the air cavities described above may include shape components including, but not being limited to parallelepipeds, cylinders, cones, random-shapes, or other shapes.

It will be understood by those skilled in the art that various changes in form and details may be made therein without departing from the spirit and scope of the invention as defined in the appended claims. Thus, the breadth and scope of the present invention should not be limited by any of the above described exemplary embodiments, but should be defined only in accordance with the following claims and their equivalents.

The invention claimed is:

1. A telephone mouthpiece for use in a wireless telephone, the telephone mouthpiece comprising:
   an enclosure having a front wall with a plurality of through-holes formed therein to permit an acoustic signal to pass into the enclosure;
   a microphone having a front surface spaced apart from the front wall, the microphone fixed within the enclosure for converting the acoustic signal to an electrical signal, and
   a microphone boot configured to support the microphone within the enclosure, the microphone boot having a front portion defining an air cavity within the enclosure and adjacent the front wall,
   wherein the air cavity and plurality of through-holes are sized to cause the telephone mouthpiece to have a passband in a frequency range of 200 Hertz (Hz) to 7000 Hz,
   wherein the mouthpiece passband has a substantially linear response within a linear range of the mouthpiece such that at a first frequency within the passband, a change in the input sound pressure level $S_{in}$ applied to the mouthpiece causes a proportional change in the output voltage $V_{out}$ produced by the mouthpiece,
   wherein the mouthpiece passband varies less than 3 dB in gain across the frequency range of 200 Hz to 7000 Hz, wherein the mouthpiece is coupled to a wideband codec and the wideband codec is coupled to a wideband vocoder, wherein the air cavity and the through-holes are sized to cause the telephone mouthpiece to have an acoustic resonance that is outside of the frequency range of 200 Hz to 7000 Hz and at least some of the plurality of through-holes have a through-length approximately equal to 1.5 millimeters and a diameter approximately equal to 1.0 millimeter.

2. The telephone mouthpiece of claim 1, wherein the microphone boot and the microphone together define a substantially cylindrically-shaped air cavity adjacent the microphone front surface.

3. The telephone mouthpiece of claim 1, wherein the microphone comprises an electret microphone.

4. The telephone mouthpiece of claim 1, wherein the microphone comprises an omni-directional microphone.

5. The telephone mouthpiece of claim 1, wherein the microphone has a passband in the frequency range of 100 Hz to 8000 Hz.

6. The telephone mouthpiece of claim 1, wherein the acoustic resonance occurs at a frequency less than 10,000 Hz.

7. The telephone mouthpiece of claim 1, wherein the acoustic resonance occurs in a frequency range of approximately 9000 Hz to 10,000 Hz.

8. The telephone mouthpiece of claim 1, wherein the wireless telephone includes an outer casing, the enclosure including at least a portion of the wireless telephone outer casing.

9. A telephone mouthpiece for use in a wireless telephone, the telephone mouthpiece comprising:
   an enclosure having a front wall with a plurality of through-holes formed therein to permit an acoustic signal to pass into the enclosure;
   a microphone having a front surface spaced apart from the front wall, the microphone fixed within the enclosure for converting the acoustic signal to an electrical signal, and
   a microphone boot configured to support the microphone within the enclosure, the microphone boot having a front portion defining an air cavity within the enclosure and adjacent the front wall,
   wherein the air cavity and plurality of through-holes are sized to cause the telephone mouthpiece to have a passband in a frequency range of 200 Hertz (Hz) to 7000 Hz,
   wherein the mouthpiece passband has a substantially linear response within a linear range of the mouthpiece such that at a first frequency within the passband, a change in the input sound pressure level $S_{in}$ applied to the mouthpiece causes a proportional change in the output voltage $V_{out}$ produced by the mouthpiece,
   wherein the mouthpiece passband varies less than 3 dB in gain across the frequency range of 200 Hz to 7000 Hz, wherein the mouthpiece is coupled to a wideband codec and the wideband codec is coupled to a wideband vocoder, wherein the air cavity and the through-holes are sized to cause the telephone mouthpiece to have an acoustic resonance that is outside of the frequency range of 200 Hz to 7000 Hz and wherein the air cavity has a volume approximately equal to 1.83E-08 cubic meters.

10. A telephone earpiece for use in a wireless telephone, the telephone earpiece comprising:
   an enclosure having a front portion and a back portion, the front portion including a plurality of through-holes formed therein; and
   a speaker having a front face and a back face, and fixed within the enclosure for converting an electrical signal to an acoustic signal,
   wherein the enclosure and the speaker are configured and arranged to define a front air cavity between the speaker front face and the enclosure front portion and a back air cavity between the speaker back face and the back portion,
   such that a volume of the front air cavity, back air cavity, and dimensions of the plurality of through holes are configured to cause the telephone earpiece to have a passband in a frequency range of 200 Hz to 7000 Hz, wherein the earpiece passband has a substantially linear response within a linear range of the earpiece such that at a first frequency within the passband, a change in the input voltage $V_{in}$ applied to the earpiece causes a proportional change in the output sound pressure level $S_{out}$ by the earpiece, wherein the earpiece passband varies less than 3 dB in gain across the frequency range of 200 Hz to 7000 Hz, wherein the earpiece is coupled to a wideband codec and the wideband codec is coupled to a wideband vocoder, wherein the back air cavity has a volume that is approximately 20 times greater than a volume of the front air cavity and the back and front air cavities have respective volumes approximately equal to 8.4 cubic centimeters ($cm^3$) and 0.4 $cm^3$.

11. The telephone earpiece of claim 10, wherein the enclosure and the speaker are configured and arranged to cause the telephone earpiece to have a stopband corresponding to frequencies greater than 7000 Hz.

12. The telephone earpiece of claim 11, wherein the speaker has a passband in a frequency range of 150 Hz to 7000 Hz.

13. The telephone earpiece of claim 10, wherein the through-holes, the front air cavity, and the back air cavity are sized to cause the telephone earpiece to have a stopband corresponding to frequencies greater than 7000 Hz.

14. The telephone earpiece of claim 10, wherein the wireless telephone includes an outer casing, the enclosure including at least a portion of the wireless telephone outer casing.

15. A telephone earpiece for use in a wireless telephone, the telephone earpiece comprising:
an enclosure having a front portion and a back portion, the front portion including a plurality of through-holes formed therein; and
a speaker having a front face and a back face, and fixed within the enclosure for converting an electrical signal to an acoustic signal,
wherein the enclosure and the speaker are configured and arranged to define a front air cavity between the speaker front face and the enclosure front portion and a back air cavity between the speaker back face and the back portion,
such that a volume of the front air cavity, back air cavity, and dimensions of the plurality of through holes are configured to cause the telephone earpiece to have a passband in a frequency range of 200 Hz to 7000 Hz,
wherein the earpiece passband has a substantially linear response within a linear range of the earpiece such that at a first frequency within the passband, a change in the input voltage $V_{in}$ applied to the earpiece causes a proportional change in the output sound pressure level $S_{out}$ by the earpiece,
wherein the earpiece passband varies less than 3 dB in gain across the frequency range of 200 Hz to 7000 Hz,
wherein the earpiece is coupled to a wideband codec and the wideband codec is coupled to a wideband vocoder, wherein the plurality of through-holes includes a large through-hole having a large diameter and a plurality of small through-holes each having a respective small diameter smaller than the large diameter, and wherein each of the plurality of through-holes has a through-length approximately equal to 1.5 mm.

16. The telephone earpiece of claim 15, wherein the large through hole has a diameter approximately equal to 1.5 millimeters (mm), and each of at least some of the plurality of small through-holes has a diameter approximately equal to 1.0 mm.

17. A wideband electro-acoustic apparatus for a wireless telephone, comprising:
a telephone mouthpiece for converting a first acoustic signal to a first electrical signal, the telephone mouthpiece having a passband in a frequency range of 200 Hertz (Hz) to 7000 Hz; and
a telephone earpiece for converting a second electrical signal to a second acoustic signal, the telephone earpiece having a passband in a frequency range of 200 Hz to 7000 Hz,
wherein the telephone mouthpiece comprises:
a mouthpiece enclosure including a front wall having a plurality of through-holes formed therein to permit the first acoustic signal to pass into the mouthpiece enclosure; and
a microphone fixed within the mouthpiece enclosure for converting the first acoustic signal to the first electrical signal, the microphone being positioned within the enclosure such that the microphone enclosure and the microphone together define an air cavity adjacent a front face of the microphone, and
wherein the air cavity and plurality of through-holes are sized to cause the telephone mouthpiece to have the mouthpiece passband in the frequency range of 200 Hz to 7000 Hz,
wherein the mouthpiece passband varies less than 3 dB in gain across the frequency range of 200 Hz to 7000 Hz, wherein the air cavity and the through-holes are sized to cause the telephone mouthpiece to have an acoustic resonance that is outside of the frequency range of 200 Hz to 7000 Hz, and at least some of the plurality of through-holes have a through-length approximately equal to 1.5 millimeters and a diameter approximately equal to 1.0 millimeter;
the wideband electro-acoustic apparatus further comprising a wideband vocoder coupled to a wideband codec coupled to the telephone mouthpiece, and coupled to the telephone earpiece, the wideband vocoder comprising an encoder for signal processing operations comprising one or more of:
speech compression,
noise estimation,
noise removal, and
voice activity detection.

18. The apparatus of claim 17, wherein the telephone earpiece comprises:
an earpiece enclosure; and
a speaker fixed within the earpiece enclosure for converting the second electrical signal to the second acoustic signal, wherein the earpiece enclosure and the speaker are configured and arranged to cause the telephone earpiece to have the earpiece passband in the frequency range of 200 Hz to 7000 Hz.

19. The telephone earpiece of claim 18, wherein the earpiece enclosure includes a front portion defining a front air cavity adjacent a front face of the speaker for generating the second acoustic signal, the front portion having a plurality of through-holes formed therein to permit the second acoustic signal to exit the earpiece enclosure.

20. The telephone earpiece of claim 19, wherein the earpiece enclosure includes a back portion space-apart from the earpiece enclosure front portion, the speaker being fixed between the earpiece enclosure front and back portions, the earpiece enclosure back portion defining a back air cavity having at least a portion thereof adjacent a back face of the speaker, wherein the earpiece through-holes, the front air cavity, and the back air cavity are sized to cause the telephone earpiece to have the earpiece passband in the frequency range of 200 Hz to 7000 Hz.

21. The apparatus of claim 20, wherein the earpiece through-holes, the front air cavity, and the back air cavity are sized to cause the telephone earpiece to have a stopband corresponding to frequencies greater than 7000 Hz.

* * * * *